Sept. 12, 1961  R. B. KINZBACH ET AL  2,999,541
MILLING TOOL
Filed Oct. 11, 1957  2 Sheets-Sheet 1
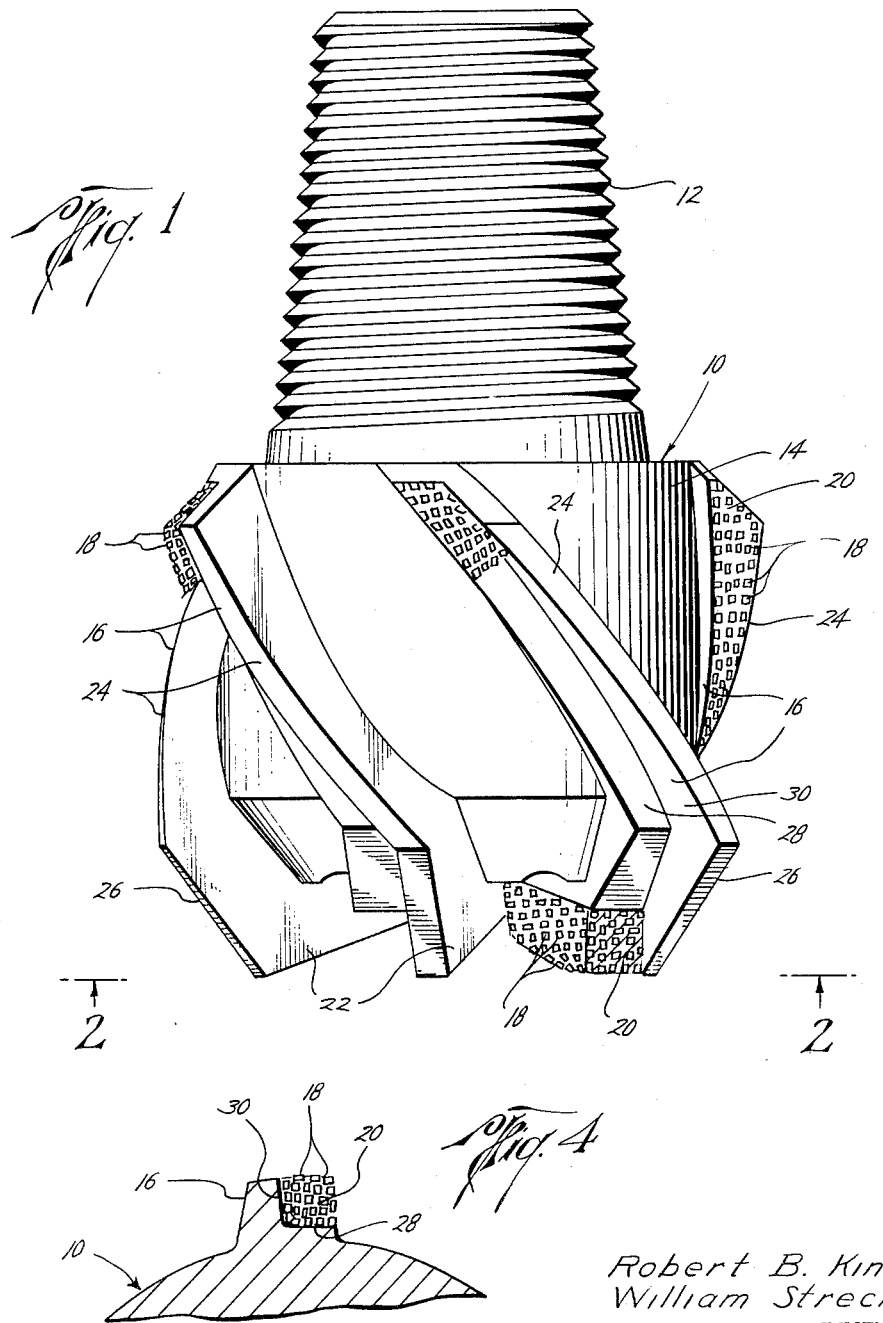
Robert B. Kinzbach
William Strecker
INVENTORS
BY Charles E. Lightfoot
ATTORNEY

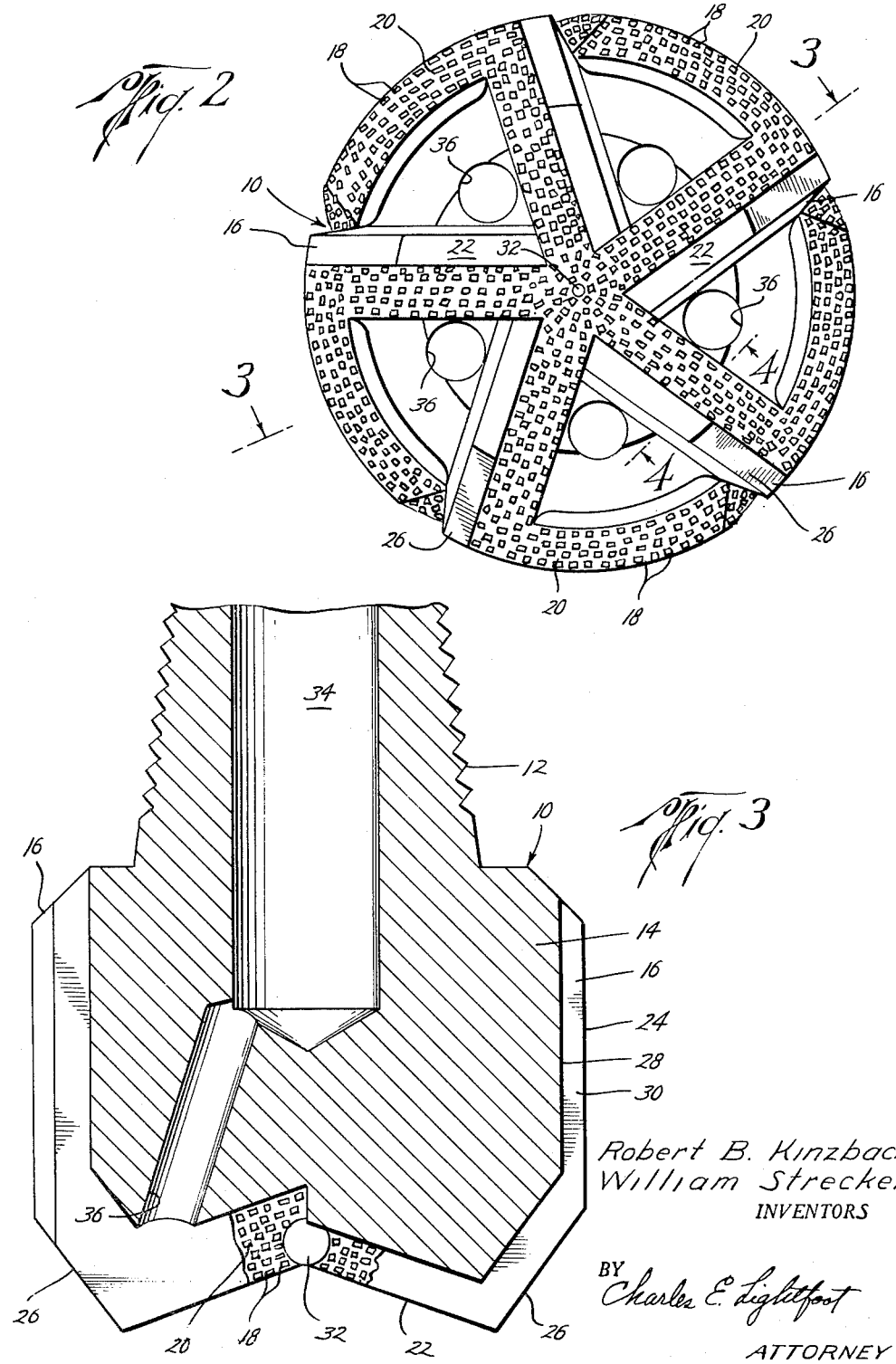

United States Patent Office 2,999,541
Patented Sept. 12, 1961

2,999,541
MILLING TOOL
Robert B. Kinzbach and William Strecker, Houston, Tex., assignors to Kinzbach Tool Company, Incorporated, Houston, Tex., a corporation of Texas
Filed Oct. 11, 1957, Ser. No. 689,650
9 Claims. (Cl. 166—55.7)

This invention relates to a milling tool and more particularly to a tool for use in performing sidetracking operations through the wall of a well casing.

The invention finds particular application in connection with milling tools of the type used in oil well subsurface maintenance and repair operations, and especially in sidetracking or deflecting operations wherein an opening is milled through the wall of the well casing for the purpose of changing the direction of the well bore, but is also applicable to milling tools used in numerous types of metal cutting operations.

In milling tools of the boring type the relative velocity of the cutting portions or edges of the tool approaches zero in the location of the axis of rotation of the tool and failure or wearing out of such tools usually occurs due to pressure distortion on a portion of the work surface in contact with the tool in an area close to the axis of rotation. Milling tools of the boring type are often provided with cutting portions formed of relatively hard and brittle material such as particles of tungsten carbide embedded in a matrix of bronze or other suitable bonding material, and in the use of such tools fracturing and displacement of the cutting particles often occurs beginning in an area at or near the axis of rotation of the tool when this area is in contact with the work surface. Eventual complete failure of the tool usually develops from the center point or axis of rotation of the tool.

In carrying out sidetracking operations in wells it has been customary heretofore to make use of cutting tools of the type having cutting blades and to employ with such a tool a deflector to cause the tool to be moved laterally while it is being moved downwardly in the well during rotation of the tool, whereby an elongated opening may be cut in the well casing. Operational difficulties are frequently encountered in the use of tools of this kind due to excessive side cutting or lateral movement of the tool which takes place during axial or longitudinal movement of the same in cutting through the casing. The transverse movement of the tool relative to the casing causes the blades to straddle the casing wall edges which results in excessive shock loads on the tool and casing, the development of ragged openings and excessive roll-off in the direction of rotation of the tool.

The present invention has for an important object the provision of a milling tool having a work engaging and cutting portion which is shaped to engage and cut a work surface intersecting the axis of rotation of the tool to increase the cutting effect of the tool in such area.

Another object of the invention is to provide a milling tool having a work engaging and cutting portion positioned to engage a work area in the vicinity of the axis of rotation of the tool and shaped to deflect the tool or distort the work in such area away from such axis during rotation of the tool whereby the cutting action of the tool on such area is increased.

A further object of the invention is the provision of a milling tool having means for improving the cutting action of the tool on the area of the work surface at and in the vicinity of the axis of rotation of the tool.

A further object of the invention is to provide a milling tool with blade sections proportioned to permit plastic deformation and erosion of the matrix and backing material to a sufficient degree to imbed carbide particles into cutting position within the work surface with the application of normal drilling weights.

Another object of the invention is to provide a milling tool for use in sidetracking operations on well casings which is shaped to provide increased areas of guiding contact between the tool and a deflecting guide in a well bore, and increased cutting contact between cutting portions of the tool and edge portions of an opening cut by the tool through the wall of the well casing.

A further object of the invention is the provision of a milling tool of the boring type which is constructed to form with the surrounding wall of the bore passageways which are shaped to provide improved circulation of drilling fluid for the removal of cuttings and frictional heat.

Another object of the invention is to provide a milling tool of the character described having cutting blades which are shaped to eliminate the infeeding tendency of the work toward the axis of rotation of the tool during the boring operation.

A further object of the invention is the provision of a tool of the type referred to having work engaging and cutting portions formed of aggregate particles of hard cutting material embedded in a matrix of bonding material and having portions which are shaped to form a backing for such cutting portions whereby more effective cutting of the work is obtained.

Another object of the invention is to provide a milling tool of the character mentioned having a body provided with external blades each of which is formed with a base portion and a side wall portion extending along and radially outwardly beyond the base portion to support and confine an aggregate of hard cutting particles embedded in a matrix of bonding material carried on the base portion and extending radially outwardly therefrom to the outer edge of the wall portion.

A further object of the invention is the provision of a milling tool of the type referred to having longitudinally extending circumferentially spaced cutting blades and wherein the cutting blades are arranged with one end portion of one blade extending circumferentially beyond the other end portion of the next blade so that the blades are in overlapping arrangement longitudinally of the body of the tool.

Another object of the invention is to provide a milling cutter having blades formed with a backing and a carbide aggregate and wherein the cross-sectional areas of the backing portions and the aggregate of the blade, which are exposed to work surfaces, are in a ratio, such as 1 to 2, to accomplish maximum effectiveness of the cutting particles.

The above and other important objects and advantages of the invention may best be understood from the following detailed description constituting a specification of the same, when considered in conjunction with the annexed drawings, wherein—

FIGURE 1 is a side elevational view of a preferred embodiment of the invention;

FIGURE 2 is a bottom end view of the invention as illustrated in FIGURE 1;

FIGURE 3 is a cross-sectional view taken along the line 3—3 of FIGURE 2, looking in the direction indicated by the arrows; and FIGURE 4 is a fragmentary cross-sectional view taken along the line 4—4 of FIGURE 2, looking in the direction indicated by the arrows.

Referring now to the drawings in greater detail, the invention is illustrated herein in connection with its application to a milling tool of the type which is used in the milling of window openings in well casings for the purpose of carrying out sidetracking operations. The tool of the invention comprises a body, generally indicated at 10, having a threaded portion 12 at its upper end for the attachment of the tool to the lower end of a lower section of a drilling string, not shown, for lowering with the string into a well bore and to be rotated thereby in contact with the well casing in the usual manner.

Below the threaded portion 12 the body has an externally enlarged portion 14 formed with external, longitudinally and radially extending, circumferentially spaced blades 16, which are shaped to support separate masses or bodies of hardened cutting material, such as tungsten carbide which are made up of an aggregate of particles, such as those indicated at 18, of such material embedded in a matrix 20 of suitable bonding material as bronze.

The blades 16 are formed with lower end portions 22 which extend downwardly beyond the lower end of the body and radially outwardly from the longitudinal central axis of the tool, and with upper longitudinally extending portions 24 which are of spiral shape or which may be positioned in angular relation to the axis of the tool. The blade portions 24 may be of helical shape and preferably counter to the direction of rotation of the body, that is, when the tool is designed for right hand or clockwise rotation the blade portions 24 will be of left hand or counterclockwise helical shape. The blades are also formed with intermediate portions 26 which are bevelled or angled outwardly and upwardly from the outer extremities of the portions 22. The blade portions 22 may be sloped or bevelled inwardly and upwardly toward the axis of the body whereby the portion of the work in contact with the lower end of the tool will be given a somewhat upwardly tapering coned shape tending to hold the tool in centered relation to the work.

Each of the blades is formed with an outwardly facing shelf or shoulder portion 30 which is coextensive with the length of the blade and a radially outwardly extending wall portion extending outwardly beyond the shelf or shoulder 28 along one side of the shelf or shoulder.

The matrix material 20 is applied to the shelf or shoulder 28 and to the adjacent face of the wall 30 of each blade throughout the length of the blade and the particles of hard material 18 are embedded in the matrix to provide an aggregate or mass forming the cutting portion of the blade. By forming the tool with the wall 30 of each blade along the trailing side of the shelf 28, the aggregate or mass containing the cutting particles 18 will form the advancing or cutting edge of each blade which will be strengthened and backed up by the wall to prevent breaking off of portions of the cutting material and substantially prolonging the life of the tool.

The portions 22 of the blades which radiate from the axis of rotation of the tool are cut away in the vicinity of and terminate short of the axis to provide a central cavity at the lower face of the tool within which a ball or other suitably shaped deflecting body 32 of hard material is positioned. This body is positioned for engagement with the work at the axis of rotation of the tool to cause displacement of the work surface, the tool, or both, to a point where relative cutting movement exists.

The body of the tool is provided with a central longitudinal bore 34, which opens upwardly at the upper end of the threaded portion, and with branch passageways 36 in communication with the bore and opening outwardly to the exterior of the body at locations between the blades 16.

By arranging and proportioning the blades so that the upper end portions of each blade extends circumferentially past the lower extremity of the longitudinally extending portion of the next blade it will be apparent that cutting portions of the blades will be in peripherally overlapping relation while at the same time the circulation of fluid in the well bore past the tool may take place freely.

The number and pitch of the blades as well as the dimensions of the same may, of course, be varied as desired.

In making use of the tool, constructed and arranged as described above, the tool is lowered into a well bore attached to the lower end of a drill pipe and moved into contact with the inner surface of the well casing in a well known manner and by the use of conventional means, whereby the casing will be milled away by rotation of the tool to form a side opening in the casing. When the tool has penetrated the casing cutting portions of the blades will at all times be in cutting contact with the edges of the opening which are being cut during the cutting operation so that straddling of the edges of the work in the direction of rotation of the tool cannot take place. The backing provided by the wall portions 30 of the blades also greatly reduces the wear on the cutting portions of the blades due to fracturing or loosening of the particles of hard material which are embedded in the matrix, thus substantially increasing the useful life of the tool.

It will thus be seen that the invention provides a milling tool of simple design and rugged construction having improved cutting and wear resisting qualities and which is of economical manufacture.

While the invention has been disclosed herein in connection with a certain specific embodiment of the same, it will be understood that this is intended by way of illustration only and that various changes can be made in the proportioning and arrangement of the parts within the spirit of the invention and the scope of the appended claims.

Having thus clearly described and shown the invention, what is claimed as new and desired to secure by Letters Patent is:

1. A milling tool comprising a generally cylindrical body having a threaded portion of reduced external diameter at its upper end for connection to the lower end of a drill string for rotation with the string, external cutting blades on the body having lower portions extending radially from the center of and projecting downwardly from the lower end of said body in angularly spaced relation and out of diametrical alignment relative to each other to prevent said lower portions from assuming positions in straddling relation to the end portion of a work piece positioned in endwise abutting engagement therewith and portions of helical shape extending radially outwardly from the body and upwardly from the outer ends of said lower portions.

2. A milling tool comprising a generally cylindrical body having a threaded portion of reduced external diameter at its upper end for connection to the lower end of a drill string for rotation with the string, external cutting blades on the body having lower portions extending radially from the center of and projecting downwardly from the lower end of said body in angularly spaced relation and out of diametrical alignment relative to each other whereby at least two of said lower end portions will be at all times in engagement with the end portion of a work piece positioned in endwise abutting engagement therewith during rotation of the tool and portions of helical shape extending radially outwardly from the body above and upwardly from the said lower portions, the lower edges of said lower portions terminating in radially spaced relation to the center of the lower end of said body and deflecting means positioned between the inner ends of said lower edges.

3. A milling tool comprising a generally cylindrical body having a threaded portion of reduced external diameter at its upper end for connection to the lower end of a drill string for rotation with the string, means on the lower end of the body forming a centrally located, downwardly projecting, downwardly convex surface, external cutting blades on the body having lower portions extending radially from said surface and projecting downwardly from the lower end of the body in angularly spaced relation and out of diametrical alignment relative to each other to prevent said lower portions from assuming a position in straddling relation to the end portion of a work piece positioned in endwise abutting engagement therewith and portions extending radially outwardly from the body and upwardly from the outer ends of said lower portions.

4. A milling tool comprising a generally cylindrical body having a threaded portion of reduced external diameter at its upper end for connection to the lower end of a drill string for rotation with the string, external cutting blades on the body having lower portions extending radially from the center of the projecting downwardly from the lower end of said body in angularly spaced relation and out of diametrical alignment relative to each other whereby at least two of said lower end portions will be at all times in engagement with the end portion of a work piece positioned in endwise abutting engagement therewith during rotation of the tool and portions extending radially outwardly from the body and helically upwardly from the outer ends of said lower portions in a direction counter to the direction in which the body is to be rotated.

5. A milling tool comprising a generally cylindrical body having a threaded portion of reduced external diameter at its upper end for connection to the lower end of a drill string for rotation with the string, external cutting blades on the body having lower portions sloping downwardly and outwardly radially from the center of and projecting downwardly from the lower end of the body in angularly spaced relation and out of diametrical alignment relative to each other to prevent said lower portions from assuming a position in straddling relation to the end portion of a work piece positioned in endwise abutting engagement therewith and portions extending radially outwardly from the body and helically upwardly from said lower portions in a direction counter to the direction in which the body is to be rotated.

6. A milling tool comprising a generally cylindrical body having a threaded portion of reduced external diameter at its upper end for connection to the lower end of a drill string for rotation with the string, external cutting blades on the body having lower portions extending radially outwardly from the center of and projecting downwardly from the lower end of the body and portions of helical shape extending radially outwardly of the body mediate the upper and lower ends of the body, said blades also having upwardly and outwardly extending portions mediate the outer ends of said lower portions and the lower ends of said helical portions.

7. A milling tool comprising a generally cylindrical body having a threaded portion of reduced external diameter at its upper end for connection to the lower end of a drill string for rotation with the string, external blades on the body having lower portions extending radially from the center of and projecting downwardly from the lower end of the body out of diametrical alignment with each other to prevent said lower portions from assuming positions in straddling relation to the end portion of a work piece positioned in endwise abutting engagement therewith in angularly spaced relation and out of diametrical alignment relative to each other whereby at least two of said lower end portions will at all times be in engagement with the end portions of a work piece positioned in endwise abutting engagement therewith during rotation of the tool and portions of helical shape extending radially outwardly from the body mediate its upper and lower ends, each of said blades being formed with an outwardly facing shoulder along its leading face and a wall extending outwardly beyond said shoulder along the trailing face of the blade and an aggregate formed of particles of a hard cutting material embedded in a metallic matrix deposited on said shoulder and extending outwardly to the outer edge of said wall.

8. A milling tool comprising a generally cylindrical body having a threaded portion of reduced external diameter at its upper end for connection to the lower end of a drill string for rotation with the string, external blades on the body, extending radially outwardly from the center of and projecting downwardly from the lower end of the body in angularly spaced relation and out of diametrical alignment relative to each other to prevent said lower portions from assuming a position in straddling relation to the end portion of a work piece positioned in endwise abutting engagement therewith, the inner ends of the lower edges of said blades terminating in radially outwardly spaced relation to said center and a deflecting body spherical in shape placed on center between the inner ends of said lower edges.

9. A milling tool comprising a generally cylindrical body having a threaded portion of reduced external diameter at its upper end for connection to the lower end of a drill string for rotation with the string, external cutting blades on the body having lower portions extending radially from the center of and projecting downwardly from the lower end of said body in angularly spaced relation and out of diametrical alignment relative to each other whereby at least two of said lower end portions will at all times be in engagement with the end portion of a work piece positioned in endwise abutting engagement therewith during rotation of the tool and upwardly extending portions extending radially outwardly from the body mediate the upper and lower ends of the body, the upper end of each of said upwardly extending portions extending circumferentially of the body beyond the lower end of the next adjacent upwardly extending portion in the direction of rotation of the body.

References Cited in the file of this patent

UNITED STATES PATENTS

| | | |
|---|---|---|
| 1,733,241 | Scott | Oct. 29, 1929 |
| 1,803,875 | Stoody | May 5, 1931 |
| 1,902,174 | Lewis | Mar. 21, 1933 |
| 1,923,487 | Howard | Aug. 22, 1933 |
| 2,014,679 | Eckroate | Sept. 17, 1935 |
| 2,213,498 | Kinzbach | Sept. 3, 1940 |
| 2,351,916 | Braun | June 20, 1944 |
| 2,360,425 | Kinzbach | Oct. 17, 1944 |
| 2,411,784 | Goldsmith | Nov. 26, 1946 |
| 2,498,159 | Gammill | Feb. 21, 1950 |
| 2,586,878 | Staton | Feb. 26, 1952 |